United States Patent
Tomono et al.

[11] Patent Number: 5,838,506
[45] Date of Patent: Nov. 17, 1998

[54] METHOD FOR PRODUCING REPLICA MIRROR FOR IMAGE RECORDING APPARATUS

[75] Inventors: Haruo Tomono, Machida; Yukio Takemura, Kawasaki; Hiroyuki Suzuki, Yokohama; Yuji Matsuo, Kawasaki; Kazumi Kimura, Toda, all of Japan

[73] Assignee: Canon Kabushiki Kaisha, Japan

[21] Appl. No.: 715,386

[22] Filed: Sep. 13, 1996

Related U.S. Application Data

[63] Continuation of Ser. No. 271,674, Jul. 7, 1994, abandoned.

[30] Foreign Application Priority Data

Jul. 9, 1993 [JP] Japan .................................. 5-194335
May 24, 1994 [JP] Japan .................................. 6-133838

[51] Int. Cl.⁶ .............................. G02B 5/08; G02B 7/182; G02B 5/122
[52] U.S. Cl. ................... 359/871; 359/872; 359/883; 359/900; 156/233; 156/239; 428/433
[58] Field of Search ................... 359/871, 872, 359/883, 900, 603; 156/233, 239; 264/261, 331.1; 428/433

[56] References Cited

U.S. PATENT DOCUMENTS

| | | | |
|---|---|---|---|
| 3,849,244 | 11/1974 | Groth | 161/192 |
| 4,068,930 | 1/1978 | Marcus | 359/602 |
| 4,272,588 | 6/1981 | Yoldas et al. | 428/433 |
| 4,386,130 | 5/1983 | Hayashi et al. | 428/215 |
| 4,436,398 | 3/1984 | Endo et al. | 354/476 |
| 4,457,598 | 7/1984 | Shimabukuro et al. | 359/883 |
| 4,465,736 | 8/1984 | Nishihara et al. | 428/332 |
| 4,482,209 | 11/1984 | Grewal et al. | 359/883 |
| 4,508,425 | 4/1985 | Tanaka et al. | 359/883 |
| 4,875,766 | 10/1989 | Shimodaira et al. | 359/883 |
| 5,050,978 | 9/1991 | Servais | 359/884 |
| 5,399,435 | 3/1995 | Ando et al. | 428/428 |
| 5,415,911 | 5/1995 | Zampa et al. | 428/40 |

FOREIGN PATENT DOCUMENTS

| | | | |
|---|---|---|---|
| 2205771 | 8/1978 | Germany | 359/883 |
| 4325124 | 2/1995 | Germany | 359/383 |
| 50-155243 | 12/1975 | Japan | G02B 5/08 |
| 60-102601 | 6/1985 | Japan | G02B 1/10 |
| 0184430 | 8/1987 | Japan | 359/883 |

*Primary Examiner*—Ricky D. Shafer
*Assistant Examiner*—Mohammad Y. Sikder
*Attorney, Agent, or Firm*—Fitzpatrick, Cella, Harper & Scinto

[57] ABSTRACT

A method for producing a replica mirror for use in an image-forming apparatus is described. The process includes a step where a mirror base plate including a mirror surface inclined with respect to the scanning axis in the image-forming apparatus is prepared. A reflective film layer is adhered to a master plate via a releasing layer. Then an adhesive material is applied to the reflective film layer. The reflective film layer is adhered to the mirror base plate via the adhesive material by pressing the mirror base plate onto the adhesive material. The reflective film layer is then transferred to the mirror base plate by peeling off the releasing layer from the reflective film layer.

4 Claims, 9 Drawing Sheets

METHOD FOR PRODUCING REPLICA MIRROR FOR IMAGE RECORDING APPARATUS

This application is a continuation of application Ser. No. 08/271,674 filed Jul. 7, 1994, now abandoned.

BACKGROUND OF THE INVENTION

1. Field of the Invention

The present invention relates to a replica mirror adapted for use in an image recording apparatus such as a copying apparatus or a facsimile apparatus, and a method for producing the same.

2. Related Background Art

Conventionally, the following movable mirror has been employed in the copying apparatus.

Figure 12A:
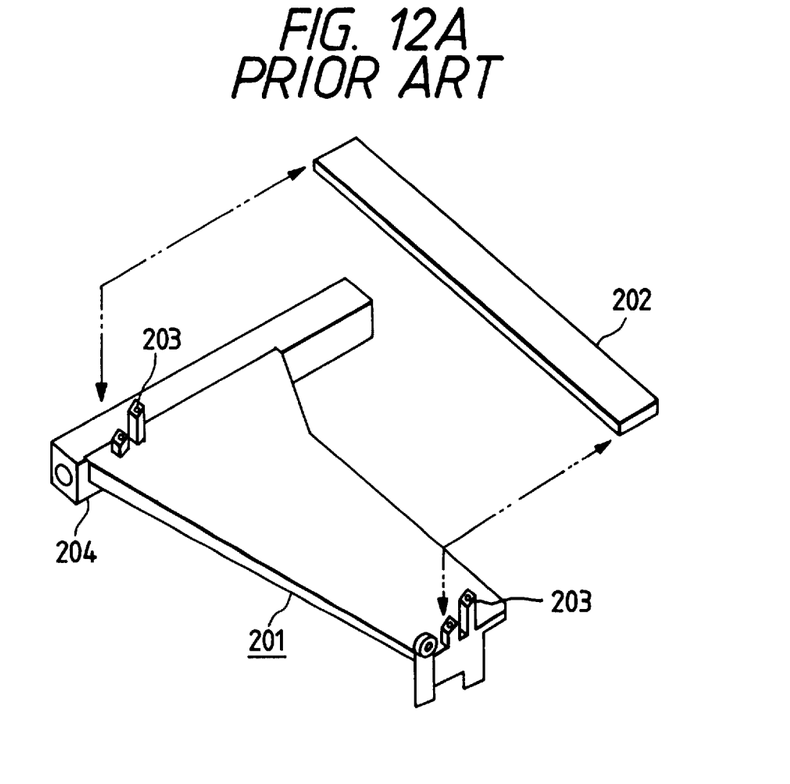
FIG. 12A is a schematic exploded perspective view of principal components.
Figure 12B:
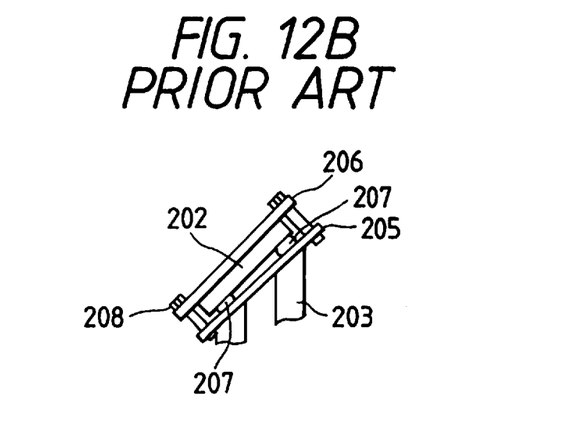
FIG. 12B is a schematic view showing a glass mirror mounting portion.

As shown in FIGS. 12A and 12B, the movable mirror is provided with a mounting portion 204 for mounting the mirror on the main body of the copying apparatus and a mirror base plate 201 having mirror support members 203 protruding at both ends. Clamp members 205 are mounted on the mirror support members 203, and a glass mirror 202 is mounted on the mirror base plate by tightening mirror pressure plates 206 with screws 208 from the copper side in a condition so that rubber pieces 207 are placed between the clamp member 205 and the glass mirror 202.

On the other hand, the following methods (i) and (ii) are already known for producing a light-weight and inexpensive optical mirror:

(i) a method of producing an optical mirror by forming a reflective thin film for example of aluminum on a reference plane of a high surfacial precision, then adhering a base plate to the reflective thin film with adhesive material, and peeling the reflective thin film together with the base plate thereby transferring the reflective thin film onto the base plate (see Japanese Patent Laid-Open Application No. 50-155243); and (ii) a method of forming an evaporated silica film and an evaporated metal film in succession on a mold coated with a releasing agent, then adhering a fiber-reinforced plastic plate thereon with a solvent-free adhesive material, and peeling the laminate at the interface of the layer of the releasing agent, thereby transferring the evaporated metal film and the evaporated silica film onto the fiber-reinforced plastic plate (see Japanese Patent Laid-Open Application No. 61-102601).

However, among these known technologies, the movable mirror formed by mounting the glass mirror on the mirror base plate becomes inevitably heavy, because the thickness of the glass has to be at least 5 mm for maintaining the surfacial precision thereof, so that when applied to a high-speed copying apparatus of a speed of 100 copies per minute or higher, such movable mirror imposes a large load on the driving motor, thus increasing the power consumption with an elevated running cost and shortening the service life. Besides, the angular adjustment of the glass mirror at the mounting on the mirror base plate is performed by regulating the amount of tightening of the screws, so that manpower is required and the productivity is low.

On the other hand, among the replica mirrors prepared by the above-mentioned known technologies, the one utilizing aluminum as the reflective film cannot be utilized in the high-resolution copying machine or the like based on precise optical design because of low reflectance. Also the one utilizing silver as the highly reflectively reflective film has been associated with a drawback of time-dependent loss of reflectance due to surfacial corrosion.

SUMMARY OF THE INVENTION

In consideration of the drawbacks of the above-explained prior technologies, the object of the present invention is to provide a replica mirror adapted for use in an image recording apparatus, having light weight and involving no angular adjustment upon the mounting, and a method of producing the same.

The above-mentioned object can be attained, according to the present invention, by a replica mirror adapted for use in an image recording apparatus, characterized by including a mirror base plate provided with a connecting portion having a reference plane or a reference axis for mounting the replica mirror on the image recording apparatus and a mirror forming portion positioned with respect to the connecting portion, and a reflective film layer composed at least of a metal film and transferred onto the mirror forming portion through an adhesive layer.

A portion where the reflective film is transferred in the mirror forming portion is an inclined plane which extends parallel to a direction crossing a scanning direction of a reading optical system.

It is also effective to provide an undercoat layer consisting of a dielectric film between the reflective film layer and the adhesive layer, or to provide a reflection enhancing layer of at least a dielectric film on the reflective film layer.

Also, according to the present invention, there is provided a method for producing a replica mirror for use in an image recording apparatus comprising the steps of preparing a transfer mold in which a transfer film, consisting of a reflective film layer composed at least of a metal film, is formed on a layer of releasing agent provided on a master plate, a mirror base plate provided with a connecting portion having a reference plane or a reference axis for mounting the replica mirror on the image recording apparatus and a mirror forming portion positioned with respect to the reference plane or reference axis, and a mold fixing member provided with a mold fixing portion for supporting the transfer mold and a guide portion for guiding the reference plane or reference axis of the mirror base plate such that the mirror forming portion is opposed to the mold fixing portion, supporting the transfer mold on the mold fixing portion of the mold fixing member, moving the reference plane or reference axis along the guide portion toward the transfer mold while the mirror forming portion of the mirror base plate is opposed to the transfer film of the transfer mold, thereby pressing an adhesive material provided between the transfer mold and the mirror forming portion, then curing the adhesive material and peeling the obtained laminate at the interface between the releasing agent layer of the transfer mold and the transfer film, thereby transferring the transfer film onto the mirror forming portion of the mirror base plate.

By only mounting the replica mirror on the image recording apparatus, the mirror forming portion bearing the transferred reflective film layer can be properly positioned, and reduction in weight is rendered possible because of the reduced number of components.

BRIEF DESCRIPTION OF THE DRAWINGS

FIGS. 12A and 12B are views showing a conventional movable mirror, wherein

DETAILED DESCRIPTION OF THE PREFERRED EMBODIMENTS

Now the present invention will be clarified in detail by embodiments thereof shown in the attached drawings.

Figure 1:
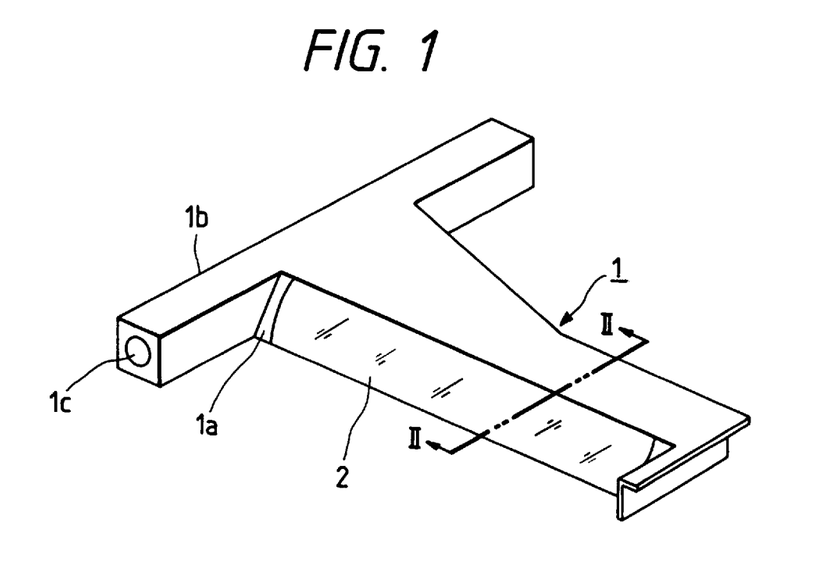
FIG. 1 is a schematic perspective view of a first embodiment of the replica mirror for image recording apparatus.
Figure 2:
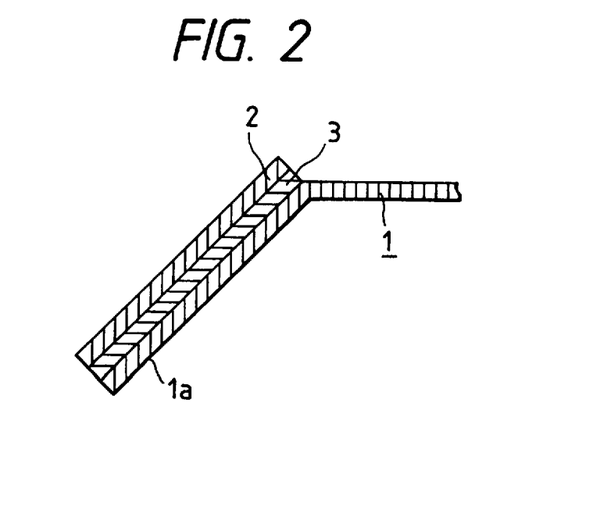
FIG. 2 is a partial schematic cross-sectional view along a line II—II in FIG. 1.

FIG. 1 is a schematic perspective view of a first embodiment of the replica mirror of the present invention for use in an image recording apparatus, and FIG. 2 is a partial schematic cross-sectional view along a line II—II in FIG. 1.

The replica mirror of the present embodiment, for use in an image recording apparatus, is provided on a mirror forming portion 1a of a mirror base plate 1 with a transferred reflective film layer 2 consisting of a metal film and adhered by an adhesive layer 3. The mirror forming portion 1a is positioned with a predetermined angle with respect to an axis of a connecting hole 1c, as a reference axis, formed in a connecting portion 1b of the mirror base plate 1. Thus, the surface of the reflective film layer 2 transferred onto the mirror forming portion 1a can be positioned by only assembling the replica mirror onto a copying apparatus by a-use of the connecting hole 1c.

In the present embodiment, an adhesive material to be employed in the adhesive layer 3 can be an epoxy adhesive, a silicone adhesive, an urethane adhesive, a phenolic adhesive, an acrylic adhesive, a chloroprene adhesive, a nitrile rubber adhesive or a hot melt adhesive. The adhesive material can be suitably selected according to the condition of use or the required strength. The thickness of the adhesive can be within a range of 10 to 500 $\mu$m and is determined according to the surfacial precision of the mirror forming portion 1a of the mirror base plate 1. In case of a mirror base plate with an unsatisfactory surfacial precision, the thickness has to be made larger in order to cover the surfacial precision, but the thickness of the adhesive material can be made smaller if the surfacial precision is satisfactorily high.

The material of the reflective film layer is selected according to the reflectance matching the application, and can be composed, for example, of aluminum, copper, silver, gold, chromium or nickel. For use in a copying apparatus, an aluminum film is preferred because of satisfactory durability and reflectance. The thickness is generally within a range of 50 to 200 $\mu$m in the case of aluminum, and is preferably as small as possible as long as pinhole formation and reflectance loss do not occur.

In the following there will be explained other embodiments of the replica mirror for use in an image recording apparatus. In these embodiments, the parts equivalent to those in the foregoing first embodiment will not be explained further, and only the different parts will be explained.

Figure 3:
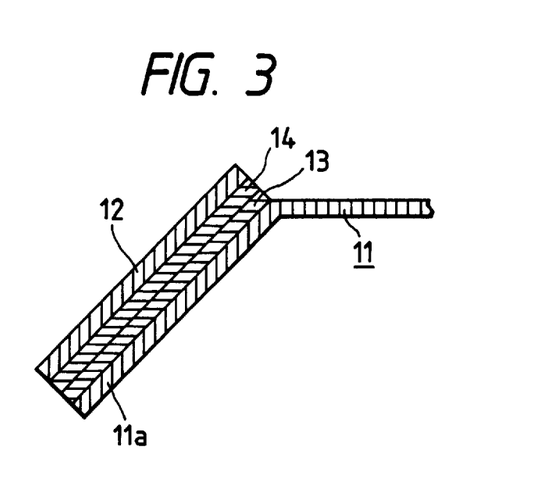
FIG. 3 is a partial schematic cross-sectional view of a second embodiment of the replica mirror for image recording apparauts.

FIG. 3 is a partial schematic cross-sectional view of a second embodiment of the replica mirror for use in an image recording apparatus. The replica mirror has an adhesive layer 13, an undercoat layer 14 and a reflective film layer 12 in this order on the mirror forming portion 11a of the mirror base plate 11.

In this embodiment, the undercoat layer 14 is provided for preventing a trace component inducing corrosion of the reflective film layer 12 such as an acid catalyst from migrating from the adhesive layer 13 to the reflective film layer 12, and can be composed of a dielectric film such as a $SiO_2$ film, a SiO film, an $Al_2O_3$ film, a BaO film or a $B_2O_3$ film. The $SiO_2$ film is preferred for the purpose of anticorrosion.

Figure 4:
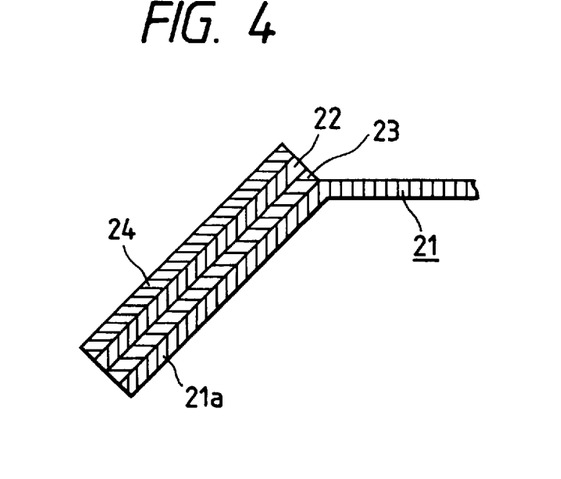
FIG. 4 is a partial schematic cross-sectional view of a third embodiment of the replica mirror for image recording apparatus.

FIG. 4 is a schematic partial cross-sectional view of a third embodiment of the replica mirror for an image recording apparatus. The replica mirror has an adhesive layer 23, a reflective film layer 22 and a reflection enhancing film 24 of at least a layer in this order on the mirror forming portion 21a of the mirror base plate 21.

In this embodiment, the reflection enhancing film 24 is provided for improving the reflectance of the reflective film layer 22. It can be composed of a single layer, but is preferably composed of a two-layered dielectric film such as a $SiO_2/TiO_2$ film, a $SiO_2/CeO_2$ film, a $SiO_2/ZnS$ film, a $SiO_2/ZrO_2$ film, $SiO_2/(Ti_2O_3$—$ZrO_2)$ mixed film, a $MgF_2/TiO_2$ film, a $MgF_2/CeO_2$ film, a $MgF_2/ZnS$ film, a $MgF_2/ZrO_2$ film or a $MgF_2/(TiO_2$—$ZrO_2)$ mixed film, respectively laminated in the order from the side of the reflective film layer 22, and particularly preferred is the $SiO_2/(Ti_2O_3$—$ZrO_2)$ mixed film.

Figure 5:
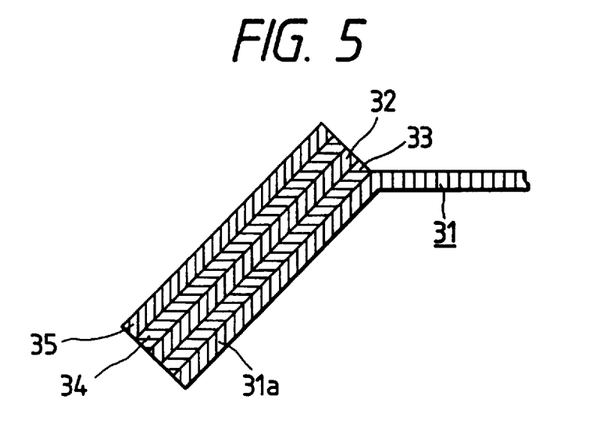
FIG. 5 is a partial schematic cross-sectional view of a fourth embodiment of the replica mirror for image recording apparatus.

FIG. 5 is a partial schematic cross-sectional view of a fourth embodiment of the replica mirror for use in an image recording apparatus. The replica mirror has an adhesive layer 33, a reflective film layer 32, a reflection enhancing film 34 and a protective layer 35 in this order on the mirror forming portion 31a of the mirror base plate 31.

In this embodiment, the protective layer 35 is provided for preventing flaws caused by, for example; external contact on the reflection enhancing film 34 from occurring. The protective layer may be formed directly on the reflective film layer, but such configuration will result in a loss in reflectance. Consequently the protective layer is preferably provided only when the reflection enhancing film is provided. The protective layer can be composed of a dielectric film such as a $SiO_2$ film, a SiO film, an $Al_2O_3$ film, a BaO film or a $B_2O_3$ film. The $SiO_2$ film is preferred.

Figure 6:
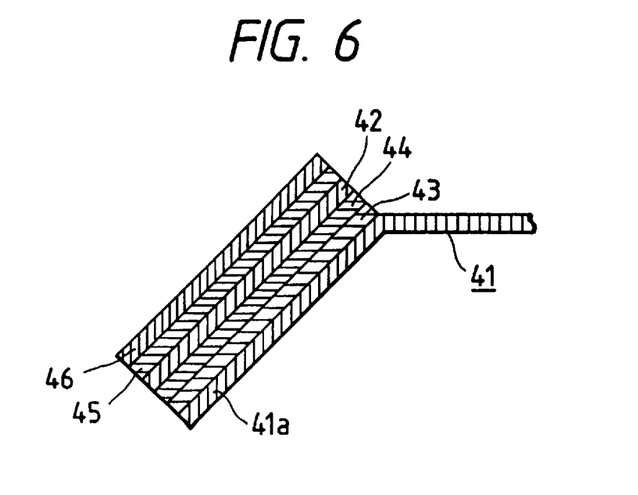
FIG. 6 is a partial schematic cross-sectional view of a fifth embodiment of the replica mirror for image recording apparatus.

FIG. 6 is a partial schematic cross-sectional view of a fifth embodiment of the replica mirror for use in an image recording apparatus. The replica mirror has an adhesive layer 43, an undercoat layer 44, a reflective film layer 42, a reflection enhancing film 45 and a protective layer in this order on the mirror forming portion 41a of the mirror base plate 41.

In the present invention, the thickness of the dielectric film for the undercoat layer or the protective layer, is generally within a range from 10 to 100 nm, preferably from 20 to 50 nm. The thickness of the reflection enhancing film is determined in consideration of the reflecting characteristics, and in case of $SiO_2/(Ti_2O_3-ZrO_2)$ mixed film, the thickness is suitably 86 and 65 nm, for example, respectively.

In the following there will be explained an application of the replica mirror of the present invention, for use in an image recording apparatus.

Figure 7:
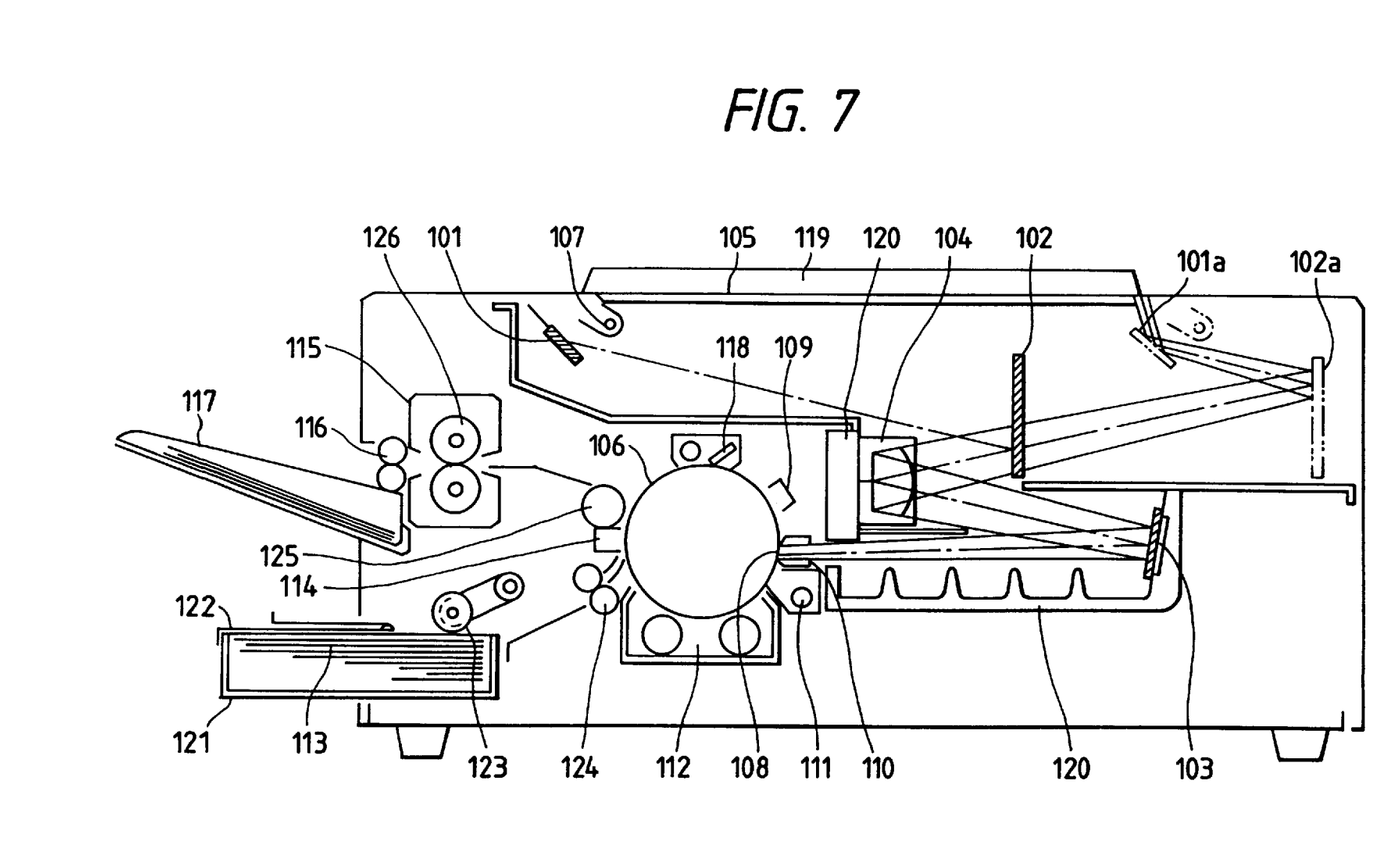
FIG. 7 is a schematic cross-sectional view of a copying apparatus employing the replica mirror of the present invention.

FIG. 7 is a schematic cross-sectional view of a copying apparatus provided with a fixed original table, of the structure of which will be outlined in the following.

When copy start button (not shown) is depressed while an original is placed on an original table 105 composed of a glass plate, a photosensitive drum 106 starts to rotate clockwise. When the photosensitive drum 106 reaches a predetermined rotation angle, an exposure start signal is output, then an illuminating lamp 107 and a first mirror 101 each constituting a movable optical unit, starts to move to the right direction of the drawing with a speed which is identical with the peripheral speed of the photosensitive drum 106, and a second mirror 102 starts to move in the same direction with a speed which is a half of the above-mentioned speed. The image of the original illuminated from below by the illuminating lamp 107, is guided in succession through a reading optical system consisting of the first mirror 101, the second mirror 102, an in-mirror lens 104 and a third mirror 103, and is formed on the photosensitive drum 106 in an exposure portion 108. The exposure is completed when the first mirror 101 and the second mirror 102 respectively reach positions 101a, 102a (shown by two dot chain line). Then, the movable optical unit, after its position is detected, terminates the above-mentioned rightward movement and immediately returns to the left direction of the drawing toward the original position.

The photosensitive drum 106 rotates clockwise as mentioned above, and is at first positively charged by a positive charger 109. Then, when it reaches the exposure portion 108, the drum 106 is AC-charged (charge elimination) by an AC charger 110 at the same time the original image is subjected to slit exposure. Subsequently, an electrostatic latent image is formed on the surface of the photosensitive drum 106 by a flush exposure with a flush exposure lamp 111, and is developed into a visible image while passing a developing unit 112. The visible image is transferred onto a recording sheet 113 supplied from a cassette 121 through a feed roller 123 and registration rollers 124. After the image transfer, the recording sheet 113 is separated by a separating roller 125 from the surface of the photosensitive drum 106, then supplied to a fixing unit 115 and is subjected to thermal fixation while passing between heated rollers 126. The recording sheet 113 after fixation is discharged by discharge rollers 116 and is placed on a tray 117.

Subsequently, the photosensitive drum 106 is subjected to removal of remaining toner by a cleaning blade 118, and repeats the above-explained cycle.

In the following there will be explained mirrors and a mirror driving device in the above-explained copying apparatus.

Figure 8:
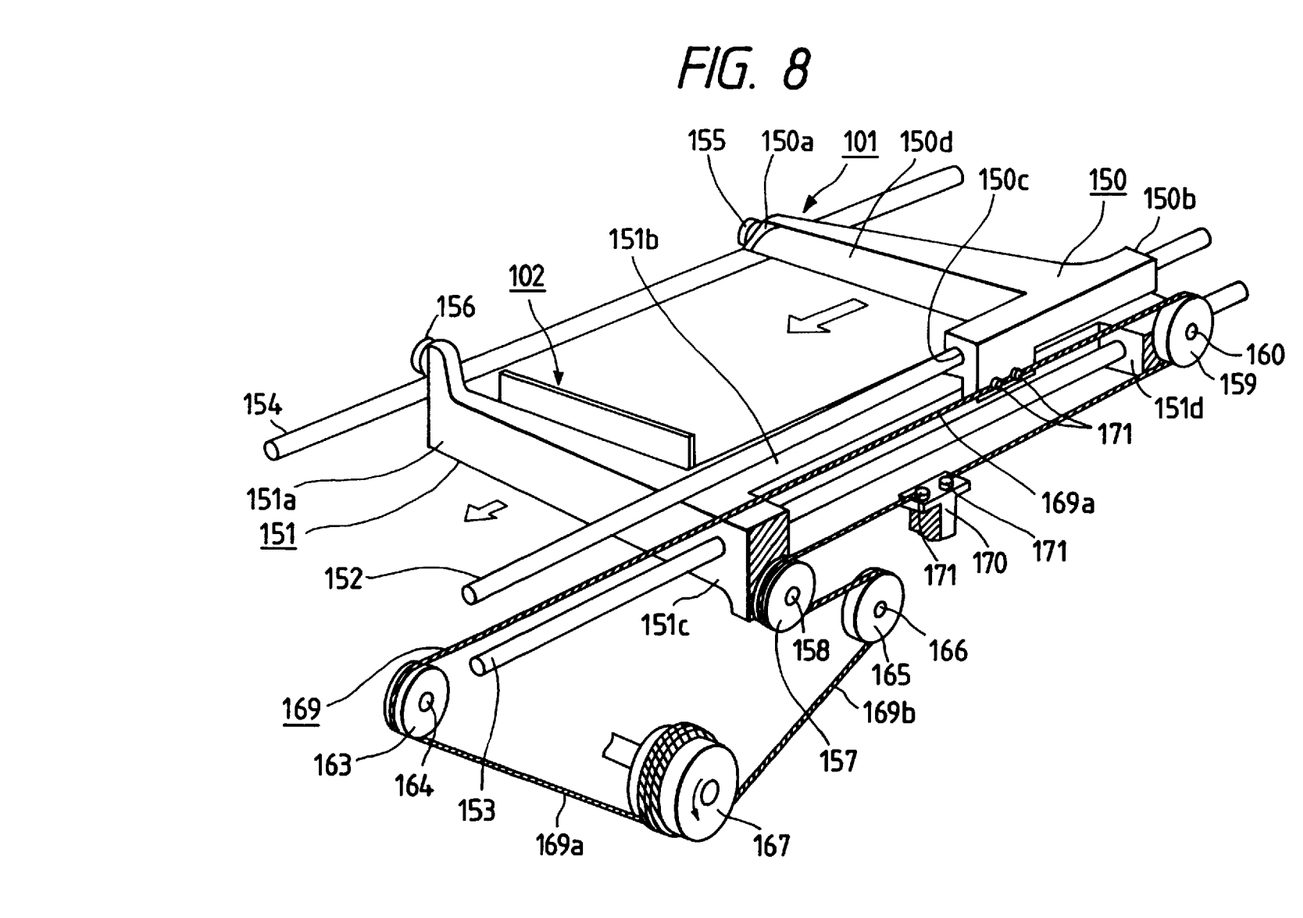
FIG. 8 is a partial schematic perspective view of a mirror driving device in the copying apparatus shown in FIG. 7.

As shown in FIG. 8, a first mirror 101 is similar to the replica mirror shown in FIG. 1.

The first mirror 101 is provided with a mirror forming portion 150a protruding from a connecting portion 150b of a mirror base plate 150 in a direction crossing the scanning direction (indicated by voided arrow) of mirror. A portion where a reflective film layer 150d of the mirror forming portion 150a is to be formed, constitutes an inclined plane extending parallel to the direction crossing the scanning direction.

Namely, a first guide rod 152 extending parallel to the mirror scanning direction is slidably fitted into a connecting hole 150c of the mirror base plate, and a roller 155 provided rotatably at the end of the mirror forming portion 150a is placed on a third guide rod 154 extending parallel to the first guide rod 152, thus the inclined plane is positioned at a predetermined angle.

A second mirror 102 is fixed on a base portion 151a of a substantially L-shaped support member 151 in such a manner that the reflecting face of the second mirror is opposed to the reflecting face of the first mirror 101, and is so constructed as to reflect the illuminating light which is reflected by the reflecting face of the first mirror 101, toward the aforementioned in-mirror lens 104 (see FIG. 7) of the copying apparatus when a second guide rod 153 is slidably fitted into connecting holes provided in first and second protruding portions 151c, 151d respectively at the base portion side and at the front end side of an arm 151b of the support member 151, and a roller 156 provided rotatably at the end of the base portion 151a is placed on the third guide rod 154.

The first guide rod 152 and the second guide rod 153 are provided in parallel manner at a certain distance in the vertical direction, whereby the mirror base plate 150 or the first mirror 101 does not interfere with the support member 151 or the second mirror 102 when scanned.

A driving pulley 167 driven by a motor (not shown) is provided in the copying apparatus at a position out of the scanning ranges of the first mirror 101 and the second mirror 102 and not interfering with the mirrors. There are provided a fixed shaft 164 rotatably supporting a first fixed pulley 163 and a fixed shaft 166 rotatably supporting a second fixed pulley 165, respectively, at certain distances on both sides of the driving pulley 167.

On the other hand, on the end face of the first protruding portion 151c of the support member 151 supporting the second mirror 102, a first movable pulley 157 is rotatably supported by a shaft 158, and on the end face of the second protruding portion 151d, a second movable pulley 159 is rotatably supported by a shaft 160.

Around the driving pulley 167 a driving wire 169 is wound two or three turns at the approximate center thereof, and a winding portion 169a of the wire is wound at the first fixed pulley 163 and the second movable pulley 159 and is fixed at the end with a screw 171 on a clamp member 170, and also fixed with screws 171 on the connecting portion 150b of the mirror base plate 150. On the other hand, an unwinding portion 169b of the driving wire 169 is wound at the second fixed pulley 165 and the first movable pulley 157 and is fixed at the end with a screw 171 on the clamp member 170.

Because the wire driving device is constructed as mentioned above, when the driving pulley 167 is rotated in a direction indicated by an arrow with a predetermined speed, the wiring portion of the wire is taken up by a predetermined length with a predetermined speed, and the unwinding portion 169b is extended by a same length with a same speed. Consequently the mirror base plate 150 or the first mirror 101 is scanned in the direction indicated by the voided arrow with the same speed as that of the driving wire 169. At the same time, because the second movable pulley 159 is rotated together with the movement of the winding portion 169a of the wire which is wound at the second movable pulley 159 and reversely moved, the support member 151 or the second mirror 102 is scanned in the same direction with a half speed of the scanning speed of the first mirror 101. In this case, the extended portion of the unwinding portion 169b is absorbed by the first movable pulley 157 moving together with the second mirror 102, so that the driving wire 169 does not loosen.

In the following there will be explained an embodiment of the method for producing the replica mirror of the present invention, in the case of producing the replica mirror shown in FIG. 2, with reference to FIGS. 9A to 9D.

Figure 9A:
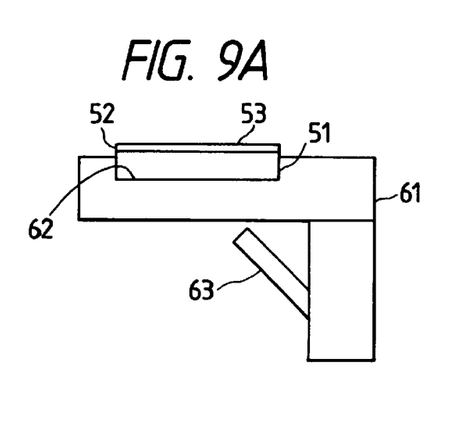
FIGS. 9A to 9D are views showing steps of an embodiment of the method for producing the replica mirror for image recording apparatus.

(1) At first a ground plane of a high precision is formed, for example, by grinding on a master plate 51, constituting a transfer mold and composed of a glass plate or a metal plate, then a layer 52 of a releasing agent is formed on the ground plane, thereafter, a reflective film layer 53, constituting a transer film and composed of a metal film, is formed thereon by a plating or by a film forming method in vacuum such as evaporation or sputtering.

The releasing agent to be employed can be of any type as long as it has a low surface tension and can be suitably coated, such as known silicone or fluorinated releasing agent. It can be coated with any method such as spin coating, dip coating, spray coating or printing, and its thickness should be of a range not so as to vary the precision of the optical surface of the transfer mold, for example 1 μm and preferably 0.1 μm or less.

(2) The master plate 51 bearing the reflective film layer 53 prepared in the aforementioned step (1) on the releasing agent layer 52, is fitted and fixed in a mold fixing portion 62 of a mold fixing member 61 while the reflective film layer is positioned on top, as shown in FIG. 9A. The fixation of the transfer mold on the mold fixing member may also be achieved with detachable fixing means such as screws.

Figure 9B:
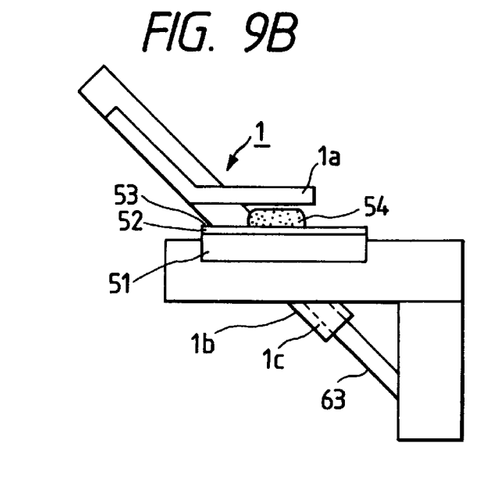
Figure 9C:
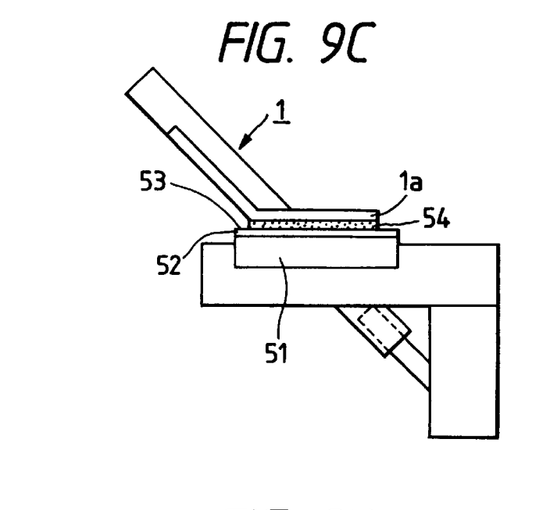

(3) Subsequently, as shown in FIG. 9B, an adhesive material 54 is dropped by using a pipette or a dispenser onto the reflective film layer 53. Then, a mirror base plate 1 is moved downwards along the guide pin 63 while a connecting hole 1c of the base plate 1 is fitted into a guide pin 63, whereby, as shown in FIG. 9C, a mirror forming portion 1a of the mirror base plate 1 is pressed downwards so as to spread the adhesive material 54. In this operation, the guide pin 63 constitutes a guide for the reference axis of the mirror base plate for causing the mirror forming portion to oppose to the mold fixing portion.

Figure 9D:
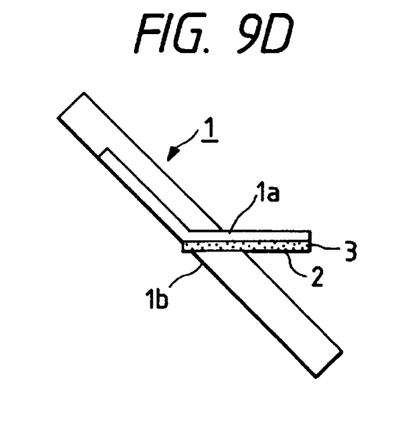

(4) After the above-explained step (3), the adhesive material is hardened to completely adhere the mirror forming portion 1a and the reflective film layer 53. Then the mirror base plate is separated from the master plate at the interface between the reflective film layer 53 adhered to the mirror forming portion 1a and the releasing agent layer 52 of the master plate 51, by means for example of a releasing jig, and the unnecessary portions of the transferred reflective film layer 53 are trimmed off, thereby obtaining, as shown in FIG. 9D, a replica mirror for use in an image recording apparatus, bearing the adhesive layer 3 and the reflective film layer 2 in this order on the mirror forming portion 1a.

In the following there will be explained the method of separation of the replica mirror, utilizing the releasing jig.

Figure 10A:
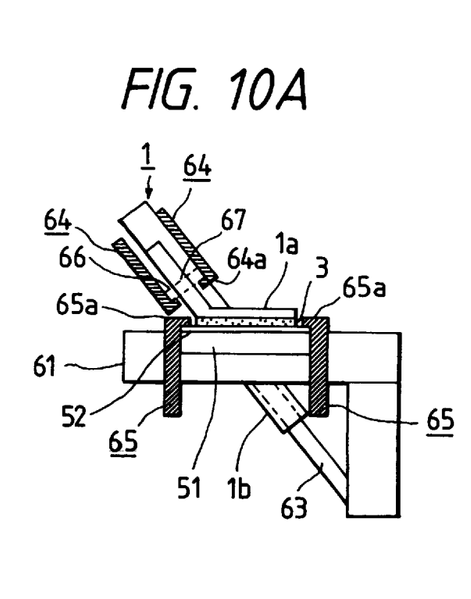
FIGS. 10A to 10C are views showing an example of the mold releasing step for the replica mirror, in the method shown in FIGS. 9A to 9D.

As shown in FIG. 10A, the mirror base plate 1 is provided in advance with a hole 67 into which a pin 66 is inserted. The pin 66 is inserted into the hole 67 to protrude both ends thereof protrude on both sides, and a hook portion 64a of a first hook member 64 is engaged with the ends. Also, a hook portion 65a of a second hook member 65 is engaged with a lateral edge of the releasing agent layer 52 of the master plate 51.

Figure 10B:
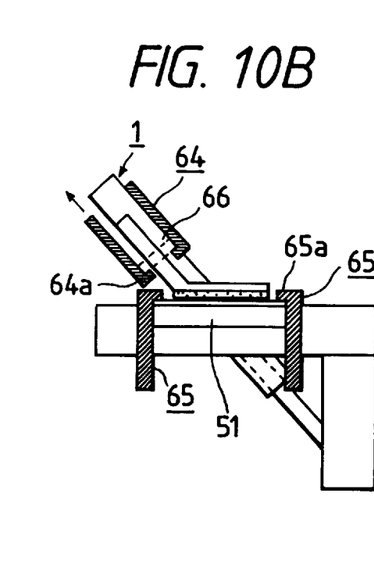
Figure 10C:
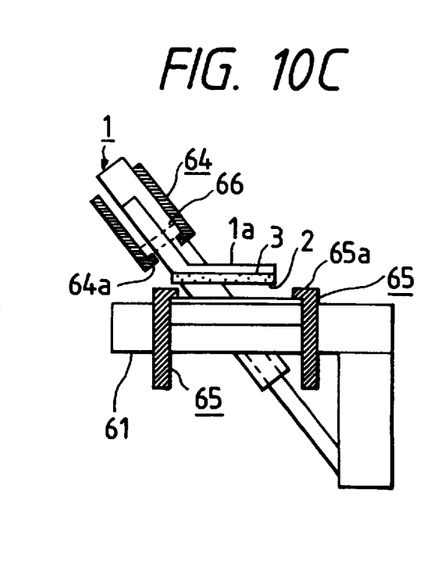

Subsequently, as shown in FIG. 10B, the first hook member 64 is pulled in a direction indicated by an arrow while the second hook member 65 is fixed, whereby the mirror base plate 1 is lifted along the guide pin 63 and, as shown in FIG. 10C, the mirror base plate and the master plate are peeled at the interface between the releasing agent layer 52 and the reflective film layer 2.

It is also possible to pull the second hook member 65 to move the master plate 51 together with the mold fixing member 61 along the guide pin 63 while the first hook member 64 is fixed.

In the present invention, a method for curing the adhesive material is determined by the kind thereof. Curing is achieved, for example, by heating in case of thermosettable adhesive, or by ultraviolet irradiation in case of ultraviolet-settable adhesive. The adhesive curing at normal temperature and having a short curing time, is advantageous also in terms of cost because hardening operation can be conducted efficiently.

In the following there will be explained, with reference to FIGS. 11A to 11C, another embodiment of the method for producing the replica mirror of the present invention.

A mold fixing member 71 to be employed in the present embodiment is provided with a mold fixing portion 72 consisting of a recess formed in a part of the member, and a guide face 73 formed at the end face of another part.

Figure 11A:
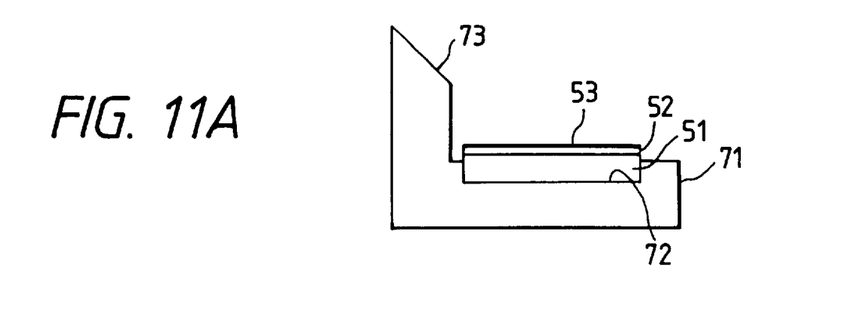
FIGS. 11A to 11C are views showing another embodiment of the method for producing the replica mirror for image recording apparatus.

A master plate 51 bearing a reflective film layer 53 on a releasing agent layer 52, is fitted and fixed in the mold fixing portion 72 as shown in FIG. 11A.

Figure 11B:
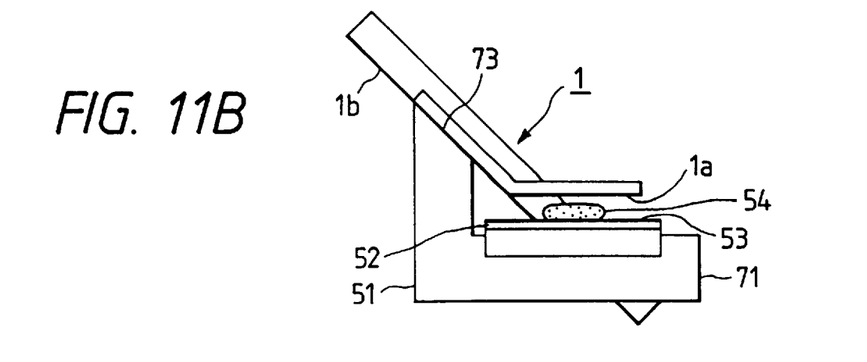
Figure 11C:
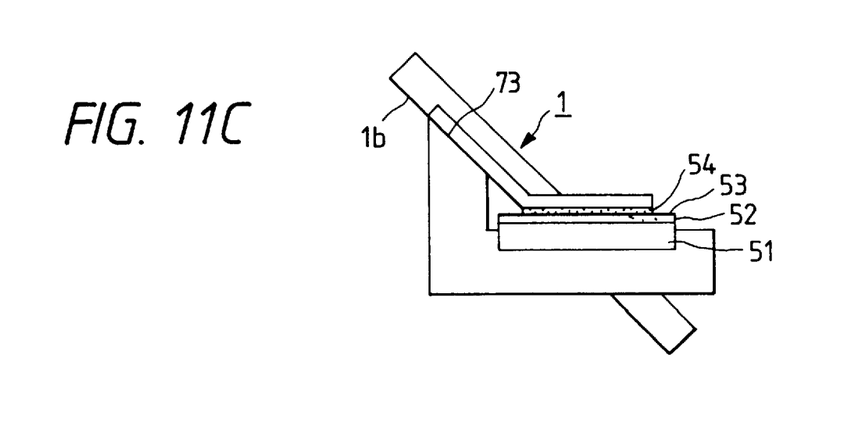

Then adhesive material 54 is dropped on the reflective film layer 53 as shown in FIG. 11B. Then the mirror base plate 1 is pressed down along the guide face 73 while a reference face of the connecting portion 1b of the base plate 1 is maintained in contact with the guide face 73 to thereby spread the adhesive material 54 in the mirror forming portion 1a as shown in FIG. 11C. In this case, the guide face 73 serves to guide the reference face of the mirror base plate such that the mirror forming portion is opposed to the mold fixing portion.

After the adhesive material 54 is cured, the mirror base plate 1 and the master plate 51 are separated at the interface between the reflective film layer 53 adhered to the mirror forming portion 1a and the releasing agent layer 52 of the master plate 51 for example by means of a releasing jig, and the unnecessary portions of the transferred reflective film layer 53 are trimmed off, whereby obtained is the replica mirror for use in an image recording apparatus.

Also, any of the second to fifth embodiments of the replica mirror of the present invention can be prepared by forming a corresponding transfer film on the transfer mold.

[EXAMPLE 1]

A well-washed blue glass plate of a dimension of 27×220 mm, a thickness of 5 mm and a surfacial precision of 5μ or less was employed as the transfer mold. It was coated surfacially with a releasing agent (KMB-7803 manufactured by Shin-etsu Chemical Co., Ltd.) diluted to 1% with isopropyl alcohol, by dip coating. Then an aluminum film of a thickness of approximate 100 nm, constituting the reflective film layer, was formed thereon by low-temperature vacuum evaporation. Then, as the mirror base plate, there was prepared a die cast aluminum plate having the shape as shown in FIG. 1 and also having a substantially planar portion, in the mirror forming portion, of a dimension of 23×240 mm, inclined by 45° with respect to the reference axis. Also there was prepared a mold fixing member made of stainless steel and having the shape as shown in FIG. 9A. The above-mentioned transfer mold was fixed on the mold fixing member, and epoxy adhesive (#1565 manufactured by Cemedyne Co.) in an amount of approximate 850 mg was linearly dropped on the reflective film layer of the transfer mold. Then the above-mentioned mirror base plate was adhered as shown in FIG. 9C. After curing for 3 hours at 60° C., the mold was separated to obtain a replica mirror as shown in FIG. 1.

In the present example, the weight of the mirror base plate was 650 g before the transfer formation of the mirror, and was 651 g after the transfer formation, so that the weight increase by mirror formation was only about 1 g.

[EXAMPLE 2]

A transfer mold same as in the example 1, was coated with the same releasing agent as in the example 1, and was subjected to the formation thereon of a $SiO_2$ protective layer of a thickness of 30 nm, an aluminum film of a thickness of 100 nm as the reflective film layer, and a $SiO_2$ undercoat layer of a thickness of 30 nm, by low-temperature vacuum evaporation. Subsequently a mirror base plate and a mold fixing member same as those in the example 1 were prepared. The transfer mold was fixed on the mold fixing member, and epoxy adhesive (DP-100 manufactured by Sumitomo 3M Co.) in an amount of approximate 900 mg was linearly dropped on the undercoat layer of the transfer mold, and the mirror base plate was adhered. After curing for 30 minutes at room temperature, the mold was separated and a replica mirror for a copying apparatus was thus obtained.

The obtained mirror showed a reflectance of 92% at 550 nm, and did not show any loss in the reflectance after standing in a chamber of 70° C., 85%RH for 500 hours.

The weight of the mirror base plate was 650 g before the transfer formation of the mirror, and was 651 g after the transfer formation, so that the weight increase by mirror formation was only about 1 g.

[EXAMPLE 3]

A transfer mold same as in the example 1 was coated with the same releasing agent as in the example 1, and was subjected to formation thereon of a $SiO_2$ protective film of a thickness of 30 nm, a $SiO_2$ reflection enhancing layer of a thickness of 86 nm, a $Ti_2O_3$—$ZrO_2$ mixed film of a thickness of 65 nm, an aluminum reflective film of a thickness of 100 nm, and a $SiO_2$ undercoat film of a thickness of 30 nm, by low-temperature vacuum evaporation. Subsequently there were prepared a mirror base plate and a mold fixing member same as in the example 1, and the transfer mold was fixed on the mold fixing member. Epoxy adhesive, same as in the example 2, in an amount of ca. 900 mg was linearly dropped on the undercoat layer, and the above-mentioned mirror base plate was adhered. After curing for 30 minutes at room temperature, the mold was separated, and a replica mirror for a copying apparatus, as shown in FIG. 6, was obtained. The obtained mirror showed a reflectance of 95% at 500 nm, and did not show any deterioration of the reflectance after standing in a chamber of 70° C., 85%RH for 500 hours.

The weight of the mirror base plate was 650 g before transfer formation of the mirror, and was 651 g after said transfer formation, so that the weight increase was only about 1 g.

[COMPARATIVE EXAMPLE]

A well-washed blue glass plate of a dimension of 30×240 mm, a thickness of 5 mm and a surfacial precision of 5 $\mu$m or less was employed as the transfer mold, and a glass mirror was prepared by forming thereon an aluminum reflective film of a thickness of 100 nm by vacuum evaporation. Then a die cast aluminum plate as shown in FIG. 12A was prepared as the mirror base plate, and the above-mentioned mirror was fixed with mirror clamps, rubber pieces, mirror pressing plates and screws to obtain a mirror for a copying apparatus.

The weight of the above-mentioned mirror base plate was 650 g and was 775 g after the glass mirror mounting, so that the weight increase by mirror mounting was 125 g.

The present invention can provide following advantages owing to the configuration explained in the foregoing.

As the surface of the reflective film layer, provided in the mirror forming portion, can be properly positioned by mere mounting on the image recording apparatus, the mirror angle regulating operation, required in the prior technology, can be eliminated and the production cost can therefore be reduced.

Also the reduced number of components allows to reduce the weight, and, in the use as a movable mirror, there can be reduced the load for the driving motor.

What is claimed is:

1. A method for manufacturing a mirror to reflect and transmit an image formed of an original in an image-forming apparatus, comprising the steps of:

(a) preparing a mirror base plate which can travel along a scanning axis in the image-forming apparatus to reflect and transmit the image formed on an original plate to a photosensitive drum, and which includes a mirror surface inclined with respect to said scanning axis;

(b) adhering a reflective film layer on a master plate via a releasing agent layer;

(c) applying an adhesive material on said reflective film layer;

(d) adhering said reflective film layer onto said mirror base plate via said adhesive material by pressing said mirror base plate onto said adhesive material; and (e) transferring said reflective film layer on said mirror base plate via said adhesive material by peeling off said releasing agent layer from said reflective film layer.

2. A method according to claim 1 wherein the method includes the step of coating a protective layer on said releasing agent layer.

3. A method according to claim 2 wherein the method includes the step of coating a reflection enhancing film layer on said releasing agent layer.

4. A method according to claim 1 wherein the method includes the step of coating a reflection enhancing layer on said releasing agent layer.

* * * * *